United States Patent [19]

Marko et al.

[11] Patent Number: 5,724,389
[45] Date of Patent: Mar. 3, 1998

[54] METHOD AND APPARATUS FOR DETECTING A PRESENCE OF A PREDETERMINED BAUD RATE

[75] Inventors: Paul Marko, Pembroke Pines, Fla.; Motty Shor, Holon; Mark Rindsberg, Jerusalem, both of Israel; Craig Wadin, Sunrise, Fla.

[73] Assignee: Motorola, Inc., Schaumburg, Ill.

[21] Appl. No.: 569,893

[22] Filed: Dec. 8, 1995

[51] Int. Cl.[6] .................................................. H04B 17/02
[52] U.S. Cl. ....................................... 375/225; 375/340
[58] Field of Search ................................ 375/224, 225, 375/334, 340; 341/61; 370/465, 545, 914

[56] References Cited

U.S. PATENT DOCUMENTS

| | | | |
|---|---|---|---|
| 5,049,875 | 9/1991 | DeLuca et al. | 340/825.44 |
| 5,077,758 | 12/1991 | DeLuca et al. | 375/342 |
| 5,095,498 | 3/1992 | DeLuca et al. | 375/340 |
| 5,311,554 | 5/1994 | Morera et al. | 375/316 |
| 5,349,695 | 9/1994 | Zhong et al. | 455/38.3 |
| 5,376,929 | 12/1994 | Rakolta et al. | 340/825.21 |
| 5,490,179 | 2/1996 | Ong | 375/345 |
| 5,497,145 | 3/1996 | Yung et al. | 340/825.44 |
| 5,507,040 | 4/1996 | Eaton et al. | 455/343 |
| 5,553,317 | 9/1996 | Hara | 455/83 |
| 5,561,693 | 10/1996 | Yung et al. | 375/377 |
| 5,563,910 | 10/1996 | Mellone et al. | 375/225 |
| 5,627,858 | 5/1997 | Mak et al. | 375/225 |

*Primary Examiner*—Young T. Tse
*Attorney, Agent, or Firm*—R. Louis Breeden; Keith A. Chanroo

[57] ABSTRACT

A method and apparatus detects (516) a baud rate in a digital signal (442). An N-state counter (404) counts at a rate N times the baud rate and the digital signal is sampled (504) to detect transitions of the digital signal. N tallies (202) record how many transitions occur coincident with each of the states of the counter, and a total number of transitions detected is computed (508). M groups (204-210) of the tallies are formed (510) corresponding to contiguous sequential states of the counter, and for each group a group number is calculated (512) indicating how many transitions are recorded in the tallies of the group. Each group is defined (514) transitional if the group number exceeds a percentage (413) of the total number of transitions, and the baud rate is determined present or absent based upon the groups that are defined as transitional.

18 Claims, 5 Drawing Sheets

METHOD AND APPARATUS FOR DETECTING A PRESENCE OF A PREDETERMINED BAUD RATE

FIELD OF THE INVENTION

This invention relates in general to digital communication systems, and more specifically to a method and apparatus for detecting a presence of a predetermined baud rate in a digital signal.

BACKGROUND OF THE INVENTION

Baud rate detectors have been used by receivers in radio communication systems for detecting a specific baud rate associated with a communication protocol compatible with the receivers. Such detectors can quickly determine whether a desired communication protocol is present on a communication channel, or that the channel is inactive.

Prior art receivers used in messaging systems typically have operated on a single radio frequency and have operated with protocols that have included preamble portions having a two-level one-zero pattern. Such receivers have employed relatively simple baud rate detectors for detecting the baud rate during one of the preamble portions.

Modern messaging protocols, such as the European Radio Messaging System (ERMES) protocol, require scanning receivers capable of operating on multiple radio frequencies. To minimize scanning time, the baud rate detectors operating on such protocols must be fast, implying that the detectors must operate during information portions of the signal as well as during the preamble portions. Unlike the preamble portions, which provide a constant number of transitions in a given sampling period, the information portions of the signal can have a wide ranging number of transitions in a given sampling period. In addition, the information portions typically utilize multi-level modulation, such as four-level frequency-shift-key (FSK) modulation.

Thus what is needed is a baud rate detector that is fast and can accurately detect a predetermined baud rate during both the preamble and information portions of the signal. The baud rate detector preferably should function over a broad range in the number of transitions occurring during a sampling period utilized for detecting the predetermined baud rate. The baud rate detector also preferably should be capable of operating correctly in a mix of two-level and multi-level modulation schemes.

SUMMARY OF THE INVENTION

An aspect of the present invention is a method for detecting a presence of a predetermined baud rate in a digital signal. The method comprises the steps of operating a modulo counter utilizing N states at a clock rate that is N times the predetermined baud rate, wherein N is a positive integer, and sampling the digital signal during a predetermined sampling period to detect transitions of the digital signal. The method further comprises the steps of generating N tallies that record how many of the transitions occur coincident with each of the states of the modulo counter over the predetermined sampling period, and computing a total number of transitions detected over the predetermined sampling period. The method also includes the steps of forming M groups of the tallies corresponding to contiguous sequential states of the modulo counter, wherein M is a positive integer, and calculating for each group a corresponding group number indicating how many of the transitions are recorded in the tallies of the group. In addition the method includes, for each group, the steps of defining the group to be transitional in response to the corresponding group number exceeding a predetermined percentage of the total number of transitions, and determining whether the predetermined baud rate is present in response to the groups that are defined to be transitional.

Another aspect of the present invention is a baud detector for detecting a presence of a predetermined baud rate in a digital signal. The baud detector comprises a clock generator for generating a clock signal operating at a clock rate that is N times the predetermined baud rate, wherein N is a positive integer, and a modulo counter coupled to the clock generator for counting the clock signal, the modulo counter utilizing N states, and a transition detector coupled to the digital signal for sampling the digital signal during a predetermined sampling period to detect transitions of the digital signal. The baud detector further comprises a processing system coupled to the transition detector and coupled to the modulo counter for generating N tallies that record how many of the transitions occur coincident with each of the states of the modulo counter over the predetermined sampling period. The processing system is programmed for computing a total number of transitions detected over the predetermined sampling period, and forming M groups of the tallies corresponding to contiguous sequential states of the modulo counter, wherein M is a positive integer. The processing system is further programmed for calculating for each group a corresponding group number indicating how many of the transitions are recorded in the tallies of the group, and, for each group, defining the group to be transitional in response to the corresponding group number exceeding a predetermined percentage of the total number of transitions. The processing system is also programmed for determining whether the predetermined baud rate is present in response to the groups that are defined to be transitional.

Another aspect of the present invention is a communication receiver for detecting a presence of a predetermined baud rate in a communication signal comprising a digital signal carrying information. The communication receiver comprises an antenna for intercepting the communication signal, and a receiver element coupled to the antenna for demodulating the communication signal to derive the digital signal. The communication receiver further comprises a first processing system coupled to the receiver element for processing the digital signal and controlling the communication receiver, and user controls coupled to the first processing system for providing control of the communication receiver by a user. The communication receiver also includes a user interface coupled to the first processing system for conveying to the user the information carried in the digital signal, and a baud detector coupled to the first processing system for detecting the predetermined baud rate. The baud detector comprises a clock generator for generating a clock signal operating at a clock rate that is N times the predetermined baud rate, wherein N is a positive integer, and a modulo counter coupled to the clock generator for counting the clock signal, the modulo counter utilizing N states. The baud detector further comprises a transition detector coupled to the digital signal for sampling the digital signal during a predetermined sampling period to detect transitions of the digital signal, and a second processing system coupled to the transition detector and coupled to the modulo counter for generating N tallies that record how many of the transitions occur coincident with each of the states of the modulo counter over the predetermined sampling period. The second processing system is programmed for computing a total number of transitions detected over the predetermined sampling period, and forming M groups of the tallies corresponding to contiguous sequential states of the modulo counter, wherein M is a positive integer. The second processing system is further programmed for calculating for each group a corresponding group number indicating how many of the transitions are recorded in the tallies of the group, and, for each group, defining the group to be transitional in response to the corresponding group number exceeding a predetermined percentage of the total number of transitions. The second processing system is also programmed for determining whether the predetermined baud rate is present in response to the groups that are defined to be transitional.

DESCRIPTION OF THE PREFERRED EMBODIMENT

Figure 1:
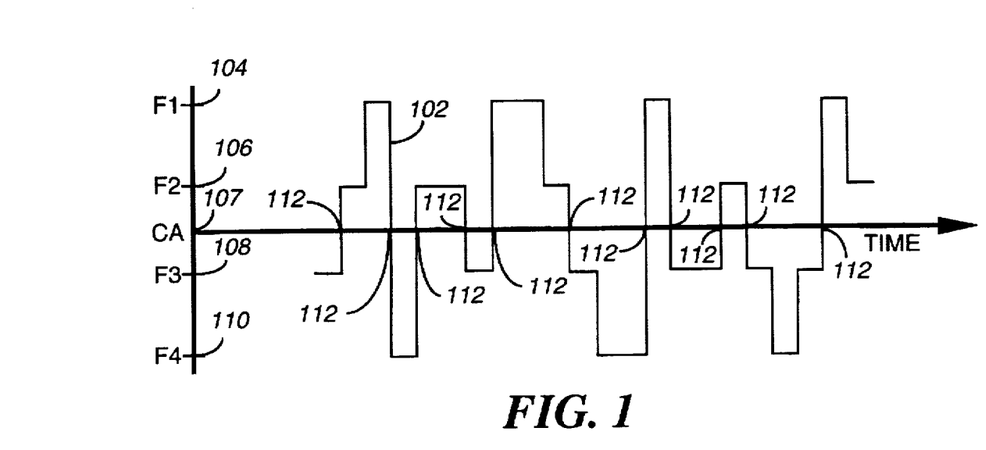
FIG. 1 is a timing diagram of a four-level FSK demodulated signal.

Referring to FIG. 1, a timing diagram depicts a four-level FSK demodulated signal 102 having symbols represented by four voltage levels 104, 106, 108, 110 corresponding to four frequency deviations. A center average value 107 is also depicted. Transitions 112 of the demodulated signal 102 are indicated where the demodulated signal 102 passes through the center average value 107. While the four-level demodulated signal 102 is used by way of example, it will become apparent to one of ordinary skill in the art that the claimed invention will perform baud detection on Mary signals having any number of modulation levels.

Figure 2:
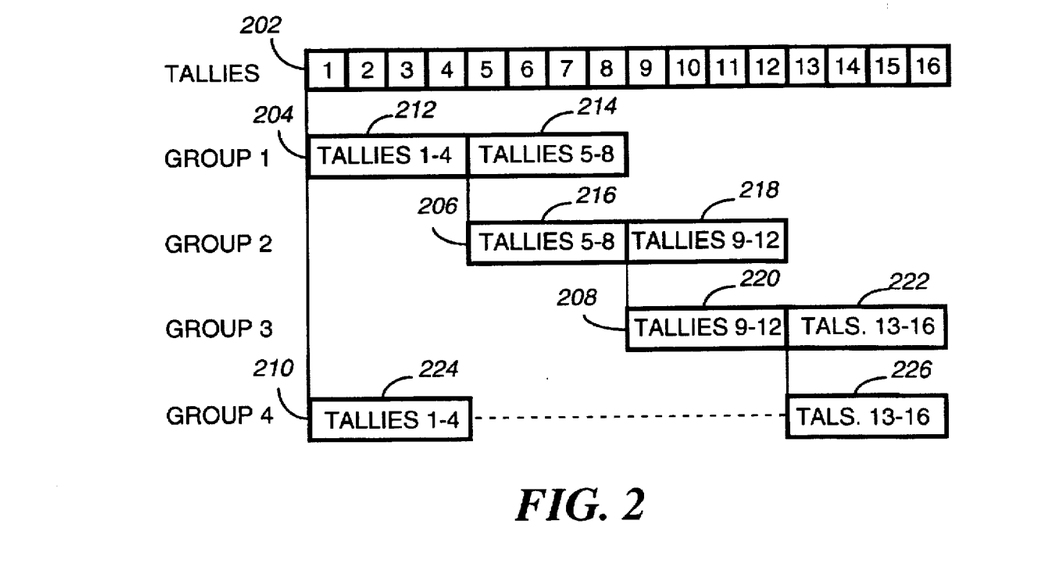
FIG. 2 is a diagram depicting a grouping of tallies of transitions of a digital signal in accordance with the preferred embodiment of the present invention.

Referring to FIG. 2, a diagram depicts a grouping of 16 tallies 202 of transitions of a digital signal corresponding to the demodulated signal 102 in accordance with the preferred embodiment of the present invention. To obtain the 16 tallies 202 a modulo-16 counter is clocked at a clock rate of 16 times a predetermined baud rate to be detected. The demodulated signal 102 is converted to a digital signal, which is then sampled for a predetermined sampling period, e.g., 40 msec. The 16 tallies 202 correspond to the 16 states of the modulo-16 counter and record how many transitions occur during the predetermined sampling period while the counter is in each of the 16 states. The 16 tallies 202 are summed at the end of the predetermined sampling period to compute the total number of transitions that have occurred during the predetermined sampling period. Preferably, detection of the predetermined baud rate is determined to have failed if the total number of transitions is outside of a predetermined range specified by a low limit TL and a high limit TH, TL and TH being positive integers, e.g., 10 and 256, respectively, in the case of the European Radio Messaging System (ERMES) protocol.

If the total number is within the predetermined range, the tallies 202 are then grouped into four groups 204, 206, 208, 210. The first group 204 comprises two sub-groups 212, 214 consisting, respectively, of tallies 1 through 4 and tallies 5 through 8. The second group 206 comprises two sub-groups 216, 218 consisting, respectively, of tallies 5 through 8 and tallies 9 through 12. The third group 208 comprises two sub-groups 220, 222 consisting, respectively, of tallies 9 through 12 and tallies 13 through 16. The fourth group 210 comprises two sub-groups 224, 226 consisting, respectively, of tallies 1 through 4 and tallies 13 through 16.

The tallies 202 belonging to each of the groups 204, 206, 208, 210 are then summed to calculate a group number for each of the groups 204, 206, 208, 210, the group number indicating how many of the transitions are recorded in all the tallies 202 of each group. The group numbers are then compared with the total number of transitions that have occurred during the predetermined sampling period to determine what percentage of the total number of transitions are recorded in the tallies 202 belonging to each group 204, 206, 208, 210. Any of the groups 204, 206, 208, 210 that exceed a predetermined percentage, e.g., 80%, of the total number are then defined to be "transitional". Otherwise, the group is defined to be "non-transitional". Preferably, the predetermined percentage is programmable.

While the preceding discussion has, by way of example, presented a preferred configuration of groups and tallies, it will be appreciated that, alternatively, other sizes, numbers, and combinations of groups and tallies can be selected in accordance with the present invention. For example, a larger number of groups, e.g., 8 groups, having 6 or 8 tallies each, can be utilized to improve resolution. In addition, the number of tallies can be changed, e.g., to 32 or 8. These and other similar variations can be expected to occur to one of ordinary skill in the art who has been taught from the disclosure presented herein of the preferred embodiment of the present invention.

Figure 3:
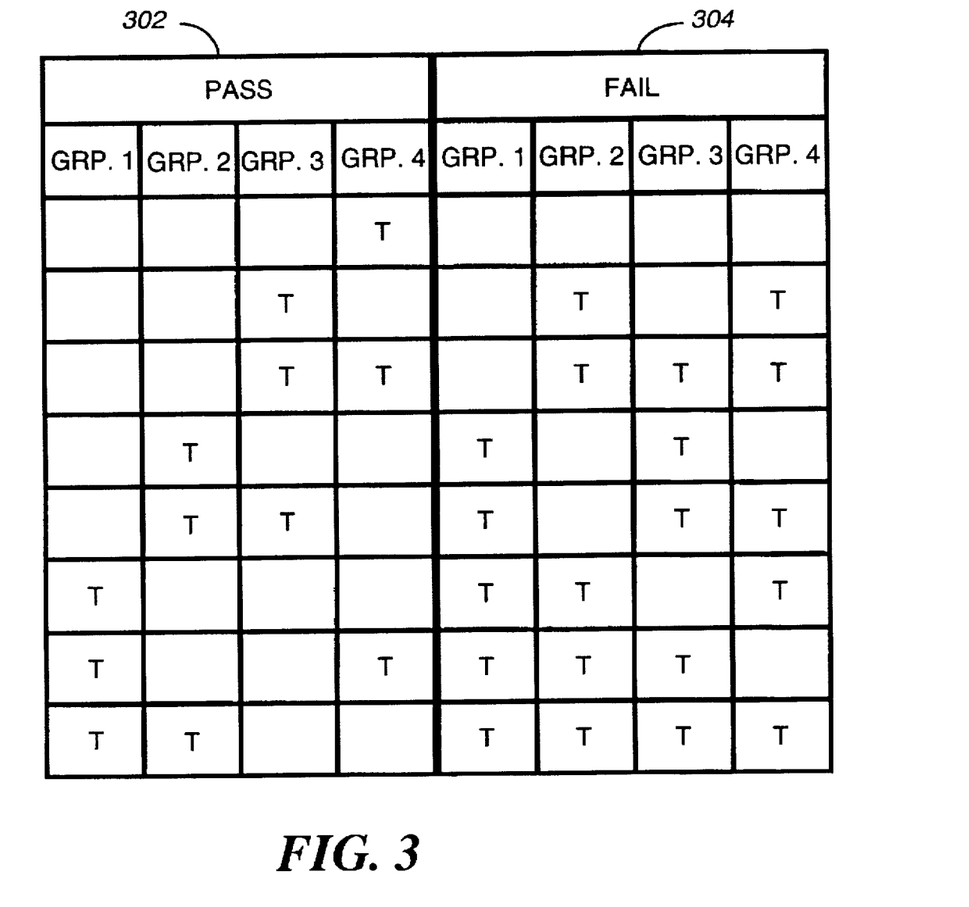
FIG. 3 is a chart depicting combinations of transitional and non-transitional groups of the tallies that pass or fail in regard to detecting a predetermined baud rate.

FIG. 3 is a chart depicting combinations of transitional and non-transitional groups of the tallies that pass or fail in regard to detecting a predetermined baud rate. Combinations that pass, meaning that the predetermined baud rate is considered to have been detected, are listed in the rows of the pass column 302. Combinations that fail, meaning that the predetermined baud rate is considered not to have been detected, are listed in the rows of the fail column 304. In either column 302, 304 the letter "T" indicates a transitional group, while an empty space indicates a non-transitional group. Note that baud detection passes if one, and only one, of the groups 204, 206, 208, 210 is defined to be transitional. Baud detection also passes if two, but no more than two, of the groups 204, 206, 208, 210 are defined to be transitional and the two groups share in common an identical sub-group 212–226. For example, the first and second groups 204, 206 share in common the sub-groups 214, 216 consisting of the identical tallies 5–8. Thus if groups 1 and 2 are defined to be transitional, baud detection passes, as shown in the last row of the pass column 302.

Figure 4:
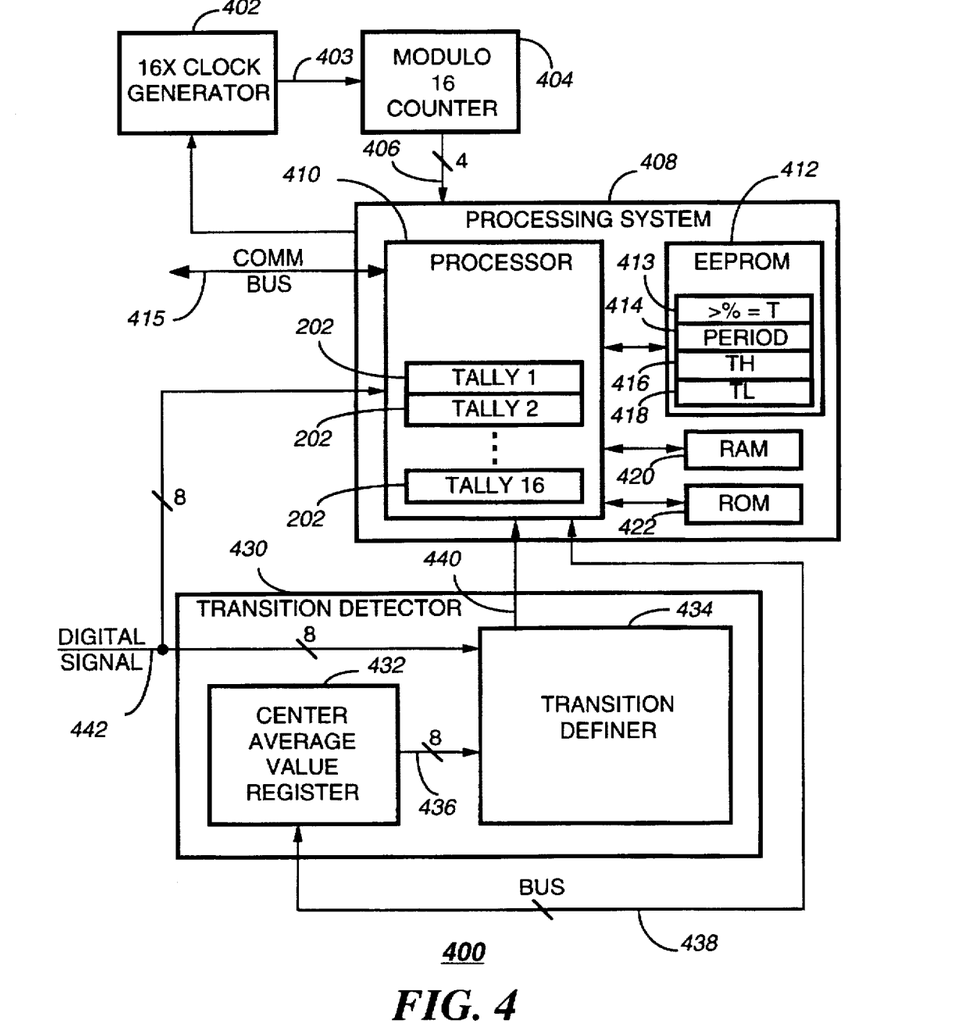
FIG. 4 is an electrical block diagram of a baud detector in accordance with the preferred embodiment of the present invention.

FIG. 4 is an electrical block diagram of a baud detector 400 in accordance with the preferred embodiment of the present invention. The baud detector 400 comprises a conventional clock generator 402 for generating a clock signal 403 that is 16 times the predetermined baud rate that is to be detected. The clock generator 402 is coupled to a conventional modulo-16 counter 404 for counting the clock signal 403. The modulo-16 counter 404 is coupled by a counter output bus 406 to a processing system 408 for generating and storing the 16 tallies 202 in registers of a processor 410. The processor 410 communicates, among other things, via a communication bus 415, a detection of the predetermined baud rate in a digital signal 442. Preferably, the processor 410 is similar to a model MC68HC05 microcomputer manufactured by Motorola, Inc. of Schaumburg, Ill. It will be appreciated that other similar processors can be utilized as well for the processor 410.

The processing system 408 also comprises a conventional electrically erasable programmable read-only memory (EEPROM) 412. The EEPROM 412 includes a location for pre-programming the predetermined percentage value 413 beyond which one of the groups 204, 206, 208, 210 is defined to be transitional, as described above. The EEPROM 412 also includes a location for pre-programming the length of the predetermined sampling period 414. In addition, the EEPROM 412 includes locations for pre-programming the high limit TH 416 and the low limit TL 418 for the expected range in the number of transitions during the sampling period.

The processing system 408 further comprises a conventional random access memory (RAM) 420 for storing temporary variables and parameters, and a conventional read-only memory (ROM) 422 for permanently storing operating firmware. It will be appreciated that, alternatively, the EEPROM 412, the RAM 420, and the ROM 422 can be manufactured in whole or in part as an integral portion of the processor 410.

The baud rate detector 400 further comprises a transition detector 430 coupled to the digital signal 442 for sampling the digital signal during the predetermined sampling period to detect transitions in the digital signal corresponding to the transitions 112 in the demodulated signal 102. The transition detector 430 comprises a register 432 coupled to the processing system 408 for storing a center average value (CAV) of the digital signal 442 as computed by the processing system 408. The digital signal 442 is also coupled to the processing system 408. The CAV is determined by the processing system 408 in a manner well known in the art by oversampling the digital signal 442 during a predetermined CAV sampling period and then calculating the average value of the samples collected.

The transition detector 430 further comprises a transition definer 434 coupled to the digital signal 442 and coupled to the register 432 for defining a transition to have occurred when the digital signal 442 has passed through the CAV. The transition definer accomplishes detection of each transition by continuously comparing the value of the digital signal with the CAV. The transition definer 434 is coupled to the processing system 408 through an output 440 for generating an interrupt to the processing system 408 coincident with each transition detected in the digital signal. Preferably the transition definer 434 is similar to the model SN74LS682 eight-bit magnitude comparator manufactured by Motorola, Inc. of Schaumburg, IL. It will be appreciated that other similar comparators can be utilized as well for the transition definer 434.

Figure 5:
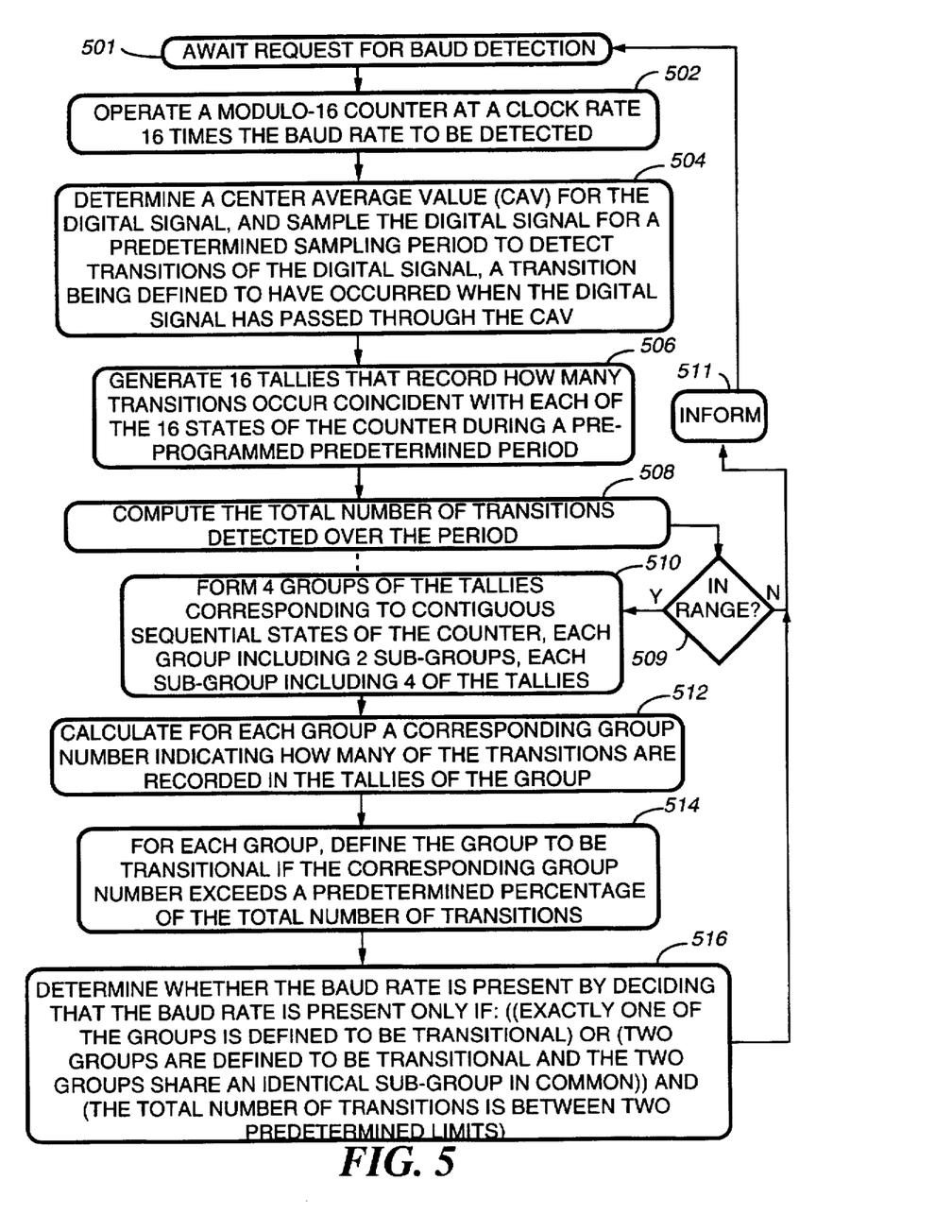
FIG. 5 is a flow chart depicting operation of the baud detector in accordance with the preferred embodiment of the present invention.

FIG. 5 is a flow chart depicting operation of the baud detector 400 in accordance with the preferred embodiment of the present invention. The flow begins with the processing system 408 awaiting 501 a request for baud detection via the communication bus 415, the request from an external device such as another processing system served by the baud detector 400. When the request arrives, the processing system 408 controls the clock generator 402 to begin operating 502 at 16 times the predetermined baud that is to be detected. The processing system 408 then oversamples the digital signal 442 at, for example, four times the symbol rate of the digital signal 442 during a CAV determining period, e.g., 40 msec. The samples are averaged by the processing system 408 in a well-known manner to determine 504 the CAV of the digital signal 442 (corresponding, by way of example, to the center average value 107 of the demodulated signal 102). The processing system 408 then transfers the CAV to the register 432 via the bus 438 for comparison with the digital signal 442 by the transition definer 434 during the predetermined sampling period 414 to detect transitions of the digital signal 442.

The processing system 408 then accesses the EEPROM 412 and controls the transition detector 430 to sample the digital signal 442 for the predetermined sampling period 414 pre-programmed into the EEPROM 412. Whenever the transition definer 434 detects a transition, the transition definer 434 sends an interrupt to the processing system 408 via the output 440. In response to the interrupt, the processing system 408 reads the current counter state indicated by the modulo-16 counter 404 on the counter output bus 406. The current counter state indicates to the processing system 408 which one of sixteen tally registers is to be incremented by a count of one for updating the corresponding one of the sixteen tallies 202 stored in the register. The processing system 408 then increments the tally 202 corresponding to the current counter state. This process is repeated for each transition of the digital signal 442 during the predetermined sampling period. At the end of the predetermined sampling period 414, the processing system 408 has generated 506 the sixteen tallies 202 that record how many of the transitions occurred coincident with each of the sixteen states of the counter 404 during the predetermined sampling period 414.

The processing system 408 next sums the sixteen tallies 202 to compute 508 the total number of transitions detected over the predetermined sampling period 414. Next the processing system 408 preferably compares the total number of transitions with the low limit TL 418 and the high limit TH 416 to determine 509 whether the total number is within the expected range for the protocol utilized. If not, the processing system 408 informs 511 the external device that the baud rate was not detected. Flow then returns to step 510 to await another request for baud detection. It will be appreciated that, alternatively, step 509 can be omitted, and step 508 can proceed directly to step 510 without the range check.

If, on the other hand, the total number of transitions is within the expected range, then the processing system 408 forms 510 the four groups 204, 206, 208, 210 of the tallies 202 corresponding to contiguous sequential states of the counter 404, each group 204, 206, 208, 210 including the two sub-groups 212–226, each sub-group including four of the tallies 202, as described herein above. The processing system 408 then calculates 512 for each group 204, 206, 208, 210 a corresponding group number indicating how many of the transitions are recorded in the tallies belonging to the group. For each group, the processing system 408 then compares the corresponding group number with the total number of transitions to determine what percentage of the total number of transitions belong to the group. If the percentage for the group exceeds the predetermined percentage value 413, then the processing system 408 defines 514 the group to be transitional.

The processing system 408 next determines 516 whether the predetermined baud rate is present by deciding that the rate is present only if (a) exactly one of the groups 204, 206, 208, 210 is defined to be transitional, or (b) exactly two groups 204, 206, 208, 210 are defined to be transitional and the two groups 204, 206, 208, 210 share in common an identical sub-group 212–226. Flow then returns to step 511 to inform the external device as to whether or not the predetermined baud rate has been determined to be present in the digital signal 442. Flow then returns to step 501 to await another request for baud detection.

The baud detector 400 in accordance with the preferred embodiment of the present invention provides several advantages over the prior art. First, the baud detector 400 is relatively fast, because it does not have to wait for a preamble portion of the signal, but can perform baud detection in any portion of the signal. Second, the baud detector 400 can function over a wide range in the number of transitions occurring during the sampling period, making the baud detector 400 insensitive to the data being transmitted during baud detection. Third, the baud detector 400 can be utilized with both two-level and multi-level modulation techniques, or a mix of both, thereby providing a high degree of flexibility.

Figure 6:
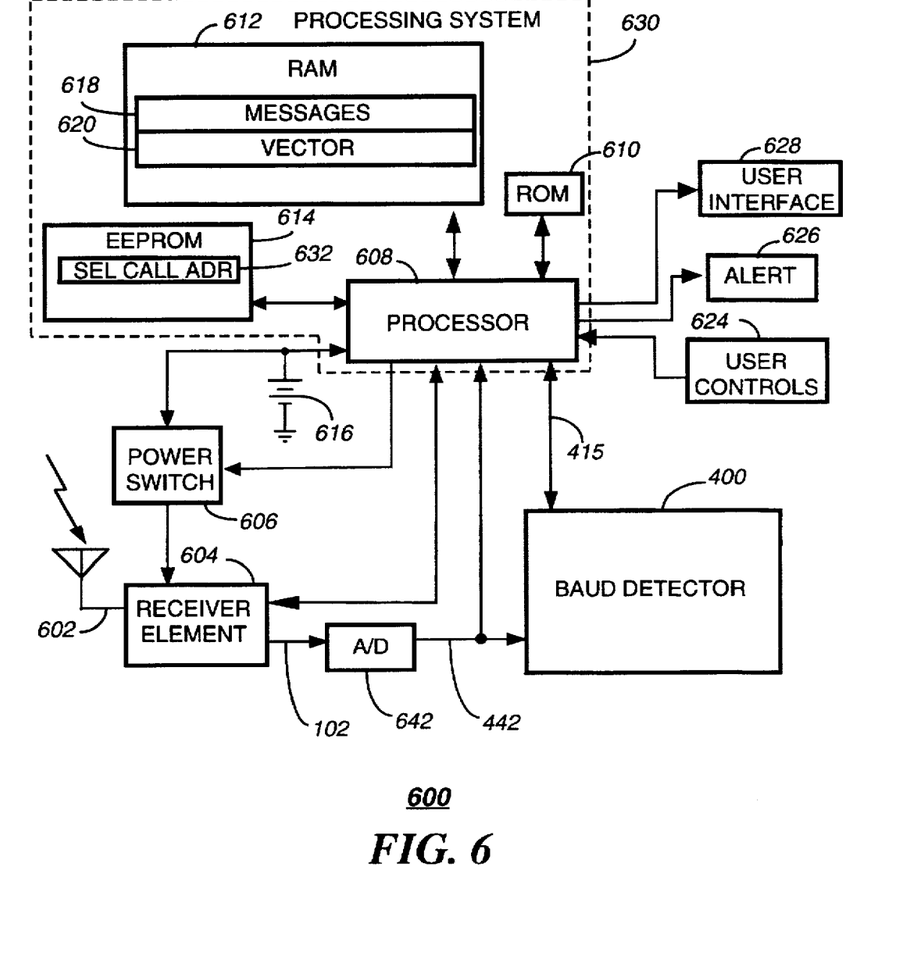
FIG. 6 is an electrical block diagram of a communication receiver in accordance with the preferred embodiment of the present invention.

FIG. 6 is an electrical block diagram of a communication receiver 600 in accordance with the preferred embodiment of the present invention. The communication receiver 600 comprises a receiver antenna 602 for intercepting a communication signal from a radio transmitter (not shown). The receiver antenna 602 is coupled to a receiver element 604, which utilizes conventional demodulation techniques for receiving the communication signal from the transmitter. Radio signals received by the receiver element 604 produce the demodulated signal 102, which is coupled to an analog to digital A/D converter 642 to produce the digital signal 442. The digital signal 442 is coupled to a processing system 630 for processing messages received from the transmitter and is coupled to the baud detector 400 for detecting the presence of the predetermined baud rate in the digital signal 442. The baud detector 400 is coupled to the processing system 630 by the communication bus 415 for communicating, among other things, the presence or absence of the predetermined baud rate. A conventional power switch 606, coupled to the processing system 630 and coupled to a battery 616 is used to control the supply of power to the receiver element 604, thereby providing a battery saving function.

To perform the necessary functions of the communication receiver 600, the processing system 630 comprises a processor 608 coupled to a random access memory (RAM) 612, a read-only memory (ROM) 610, and an electrically erasable programmable read-only memory (EEPROM) 614. Preferably, the processor 608 is similar to the M68HC08 micro-controller manufactured by Motorola, Inc. It will be appreciated that other similar processors can be utilized for the processor 608, and that additional processors of the same or alternative type, as well as a hardware decoder, can be added as required to handle the processing requirements of the processing system 630. It will be also appreciated that other types of memory, e.g., EEPROM or FLASH, can be utilized for the ROM 610, as well as the RAM 612. It will be further appreciated that the RAM 612 and the ROM 610, singly or in combination, can be incorporated as an integral portion of the processor 608. It will be still further appreciated that, alternatively, the processing system 630 of the communication receiver 600 and the processing system 408 of the baud detector 400 can be combined into a single processing system.

The processing system 630 is programmed by way of the ROM 610 to process incoming messages. To process a message, the processor 608 periodically activates the receiver element 604 through the power switch 606 and cooperates with the baud detector 400 to determine whether to remain on a currently selected channel (if the correct baud rate is detected within a predetermined time), or, conversely, to scan for another channel. During message processing following successful baud rate detection, the processor 608 decodes in a conventional manner an address in the demodulated data of the message, compares the decoded address with one or more selective call addresses 632 stored in the EEPROM 614, and when a match is detected, the processor 608 proceeds to decode a corresponding vector 620 received from the transmitter for designating where and when the transmitter will transmit an information portion of the message to the receiver 600. The vector 620 is stored in the RAM 612, and at the designated time the processing system 630 activates the receiver element 604 for receiving the information portion.

Once the processor 608 has processed the message, it stores the message in a location for messages 618 in the RAM 612, and a call alerting signal is generated to alert a user that a message has been received. The call alerting signal is directed to a conventional audible or tactile alerting device 626 for generating an audible or tactile call alerting signal. The message can be accessed by the user through user controls 624, which provide functions such as lock, unlock, delete, read, etc. More specifically, by the use of appropriate functions provided by the user controls 624, the message is recovered from the RAM 612, and then conveyed to the user through a user interface 628, e.g., a conventional liquid crystal display (LCD), or a loudspeaker.

Thus, it should be apparent by now that the present invention provides a baud rate detector that is fast and can accurately detect a predetermined baud rate during both the preamble and information portions of a communication signal. The baud rate detector advantageously can function over a broad range in the number of transitions occurring during a sampling period utilized for detecting the predetermined baud rate. The baud rate detector is also capable of operating correctly in a mix of two-level and multi-level modulation schemes.

While the foregoing description has presented a preferred embodiment in accordance with the present invention, it will be appreciated by one of ordinary skill in the art that various changes and modifications can be made, as discussed herein above. Accordingly, the scope of the invention is delimited only in accordance with the following claims.

What is claimed is:

1. A method for detecting a presence of a predetermined baud rate in a digital signal, comprising the steps of:

operating a modulo counter utilizing N states at a clock rate that is N times the predetermined baud rate, wherein N is a positive integer;

sampling the digital signal during a predetermined sampling period to detect transitions of the digital signal;

generating N tallies that record how many of the transitions occur coincident with each of the states of the modulo counter over the predetermined sampling period;

computing a total number of transitions detected over the predetermined sampling period;

forming M groups of the tallies corresponding to contiguous sequential states of the modulo counter, wherein M is a positive integer;

calculating for each group a corresponding group number indicating how many of the transitions are recorded in the tallies of the group;

for each group, defining the group to be transitional in response to the corresponding group number exceeding a predetermined percentage of the total number of transitions; and determining whether the predetermined baud rate is present in response to the groups that are defined to be transitional.

2. The method of claim 1, wherein N is a multiple of four, and wherein the forming step comprises forming four groups of the tallies, each group comprising two sub-groups, each sub-group including one-quarter of the tallies, and wherein the determining step comprises the step of deciding that the predetermined baud rate is present only if:
one, but no more than one, of the four groups is defined to be transitional, or
two, but no more than two, of the four groups are defined to be transitional, and the two share an identical sub-group in common.

3. The method of claim 1, wherein the sampling step comprises the steps of:
determining a center average value for the digital signal; and
defining a transition to have occurred when the digital signal has passed through the center average value.

4. The method of claim 1, wherein the predetermined sampling period is programmable, and wherein the method further comprises the step of determining the predetermined sampling period by accessing a programmable memory location prior to the sampling step.

5. The method of claim 1, wherein the determining step further comprises the step of deciding that the predetermined baud rate is present only if the total number of transitions detected over the predetermined sampling period is between TL and TH, inclusive, wherein TL and TH are positive integers.

6. The method of claim 5, wherein the digital signal conforms to a protocol defined by a European Radio Messaging System (ERMES) specification, and wherein TL=10 and TH=256.

7. A baud detector for detecting a presence of a predetermined baud rate in a digital signal, the baud detector comprising:

a clock generator for generating a clock signal operating at a clock rate that is N times the predetermined baud rate, wherein N is a positive integer;

a modulo counter coupled to the clock generator for counting the clock signal, the modulo counter utilizing N states;

a transition detector coupled to the digital signal for sampling the digital signal during a predetermined sampling period to detect transitions of the digital signal; and a processing system coupled to the transition detector and coupled to the modulo counter for generating N tallies that record how many of the transitions occur coincident with each of the states of the modulo counter over the predetermined sampling period, wherein the processing system is programmed for:
computing a total number of transitions detected over the predetermined sampling period;
forming M groups of the tallies corresponding to contiguous sequential states of the modulo counter, wherein M is a positive integer;
calculating for each group a corresponding group number indicating how many of the transitions are recorded in the tallies of the group;
for each group, defining the group to be transitional in response to the corresponding group number exceeding a predetermined percentage of the total number of transitions; and
determining whether the predetermined baud rate is present in response to the groups that are defined to be transitional.

8. The baud detector of claim 7, wherein N is a multiple of four, and wherein the processing system is further programmed for:
forming four groups of the tallies, each group comprising two sub-groups, each sub-group including one-quarter of the tallies, and
deciding that the predetermined baud rate is present only if:
one, but no more than one, of the four groups is defined to be transitional, or
two, but no more than two, of the four groups are defined to be transitional, and the two share an identical sub-group in common.

9. The baud detector of claim 7, wherein the processing system is further programmed for determining a center average value for the digital signal, and wherein the transition detector comprises:
a register coupled to the processing system for storing the center average value; and
a transition definer coupled to the register and coupled to the digital signal for defining a transition to have occurred when the digital signal has passed through the center average value.

10. The baud detector of claim 7, wherein the predetermined sampling period is programmable, and wherein the processing system is further programmed for determining the predetermined sampling period by accessing a programmable memory location.

11. The baud detector of claim 7, wherein the processing system is further programmed for deciding that the predetermined baud rate is present only if the total number of transitions detected over the predetermined sampling period is between TL and TH, inclusive, wherein TL and TH are positive integers.

12. The baud detector of claim 11, wherein the digital signal conforms to a protocol defined by a European Radio Messaging System (ERMES) specification, and wherein TL=10 and TH=256.

13. A communication receiver for detecting a presence of a predetermined baud rate in a communication signal comprising a digital signal carrying information, the communication receiver comprising:

an antenna for intercepting the communication signal;

a receiver element coupled to the antenna for demodulating the communication signal to derive the digital signal;

a first processing system coupled to the receiver element for processing the digital signal and controlling the communication receiver;

user controls coupled to the first processing system for providing control of the communication receiver by a user;

a user interface coupled to the first processing system for conveying to the user the information carried in the digital signal; and a baud detector coupled to the first processing system for detecting the predetermined baud rate, the baud detector comprising:

a clock generator for generating a clock signal operating at a clock rate that is N times the predetermined baud rate, wherein N is a positive integer;

a modulo counter coupled to the clock generator for counting the clock signal, the modulo counter utilizing N states;

a transition detector coupled to the digital signal for sampling the digital signal during a predetermined sampling period to detect transitions of the digital signal; and a second processing system coupled to the transition detector and coupled to the modulo counter for generating N tallies that record how many of the transitions occur coincident with each of the states of the modulo counter over the predetermined sampling period, wherein the second processing system is programmed for:

computing a total number of transitions detected over the predetermined sampling period;

forming M groups of the tallies corresponding to contiguous sequential states of the modulo counter, wherein M is a positive integer;

calculating for each group a corresponding group number indicating how many of the transitions are recorded in the tallies of the group;

for each group, defining the group to be transitional in response to the corresponding group number exceeding a predetermined percentage of the total number of transitions; and determining whether the predetermined baud rate is present in response to the groups that are defined to be transitional.

14. The communication receiver of claim 13, wherein N is a multiple of four, and wherein the second processing system is further programmed for:

forming four groups of the tallies, each group comprising two sub-groups, each sub-group including one-quarter of the tallies, and deciding that the predetermined baud rate is present only if:

one, but no more than one, of the four groups is defined to be transitional, or two, but no more than two, of the four groups are defined to be transitional, and the two share an identical sub-group in common.

15. The communication receiver of claim 13, wherein the second processing system is further programmed for determining a center average value for the digital signal, and wherein the transition detector comprises:

a register coupled to the second processing system for storing the center average value; and a transition definer coupled to the register and coupled to the digital signal for defining a transition to have occurred when the digital signal has passed through the center average value.

16. The communication receiver of claim 13, wherein the predetermined sampling period is programmable, and wherein the second processing system is further programmed for determining the predetermined sampling period by accessing a programmable memory location.

17. The communication receiver of claim 13, wherein the second processing system is further programmed for deciding that the predetermined baud rate is present only if the total number of transitions detected over the predetermined sampling period is between TL and TH, inclusive, wherein TL and TH are positive integers.

18. The communication receiver of claim 17, wherein the digital signal conforms to a protocol defined by a European Radio Messaging System (ERMES) specification, and wherein TL=10 and TH=256.

* * * * *